Sept. 19, 1950 F. KOECKRITZ 2,522,793
NO-SWAY TRAILER HITCH
Filed Nov. 27, 1946 6 Sheets-Sheet 5
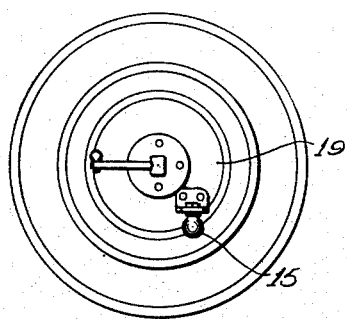
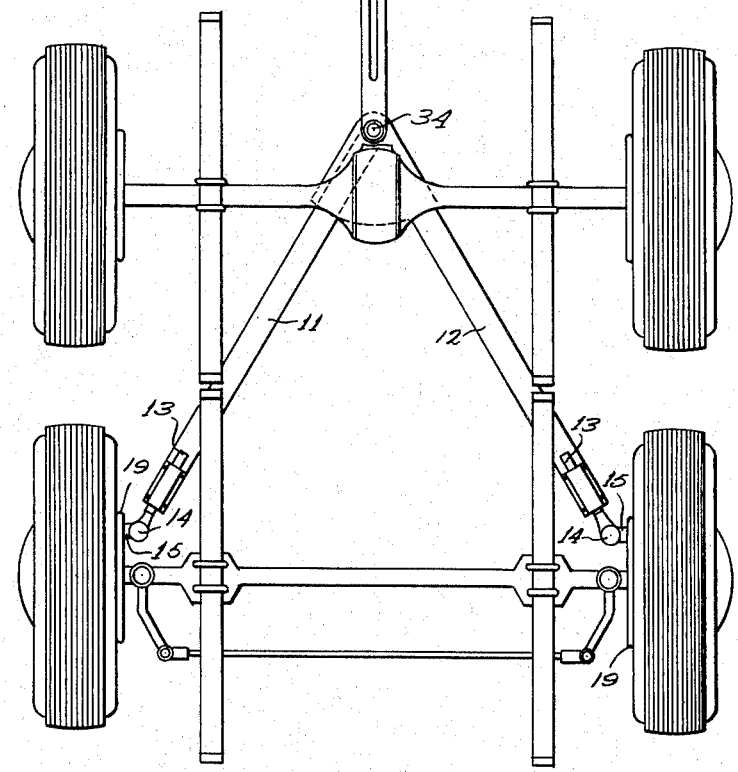
INVENTOR.
Fred Koeckritz,
BY Victor J. Evans & Co.
ATTORNEYS Sept. 19, 1950 F. KOECKRITZ 2,522,793
NO-SWAY TRAILER HITCH
Filed Nov. 27, 1946 6 Sheets-Sheet 6
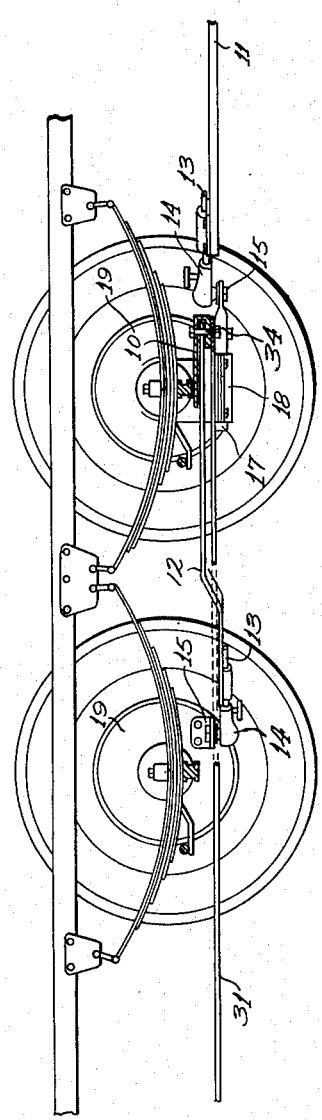
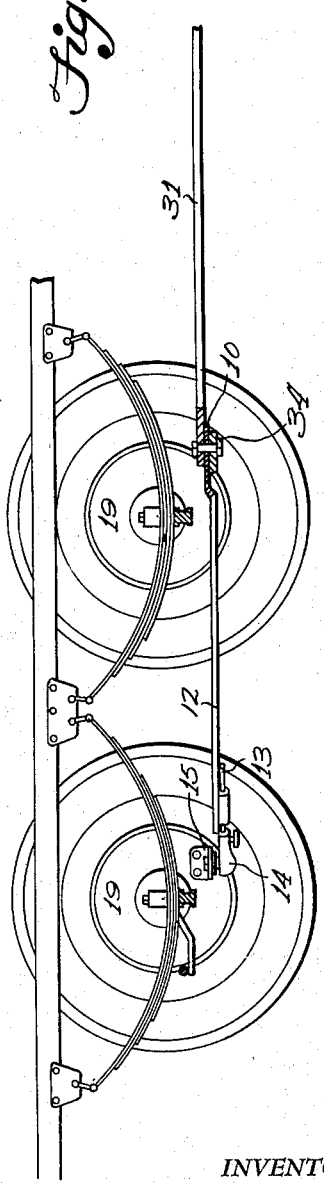
INVENTOR.
Fred Koeckritz,
BY Victor J. Evans & Co.
ATTORNEYS Patented Sept. 19, 1950

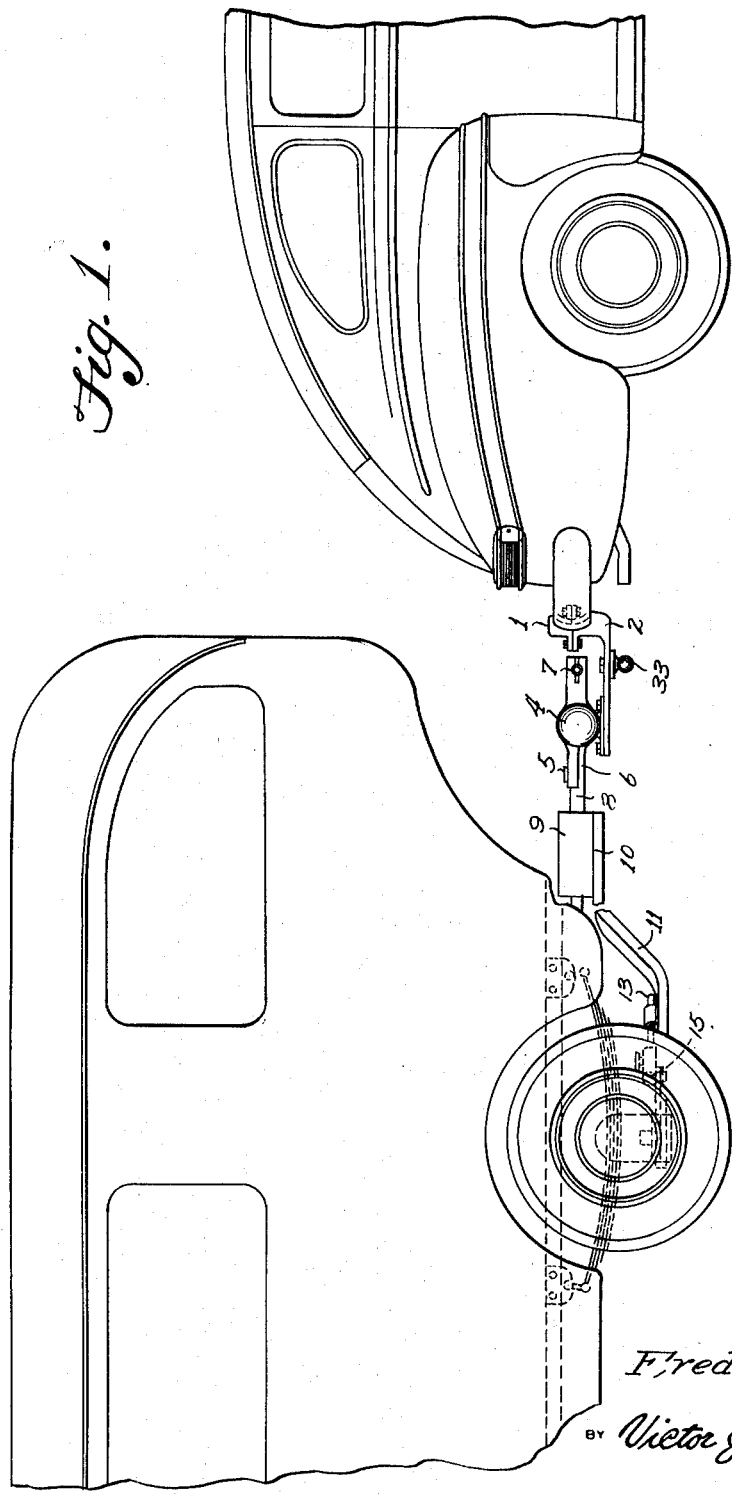

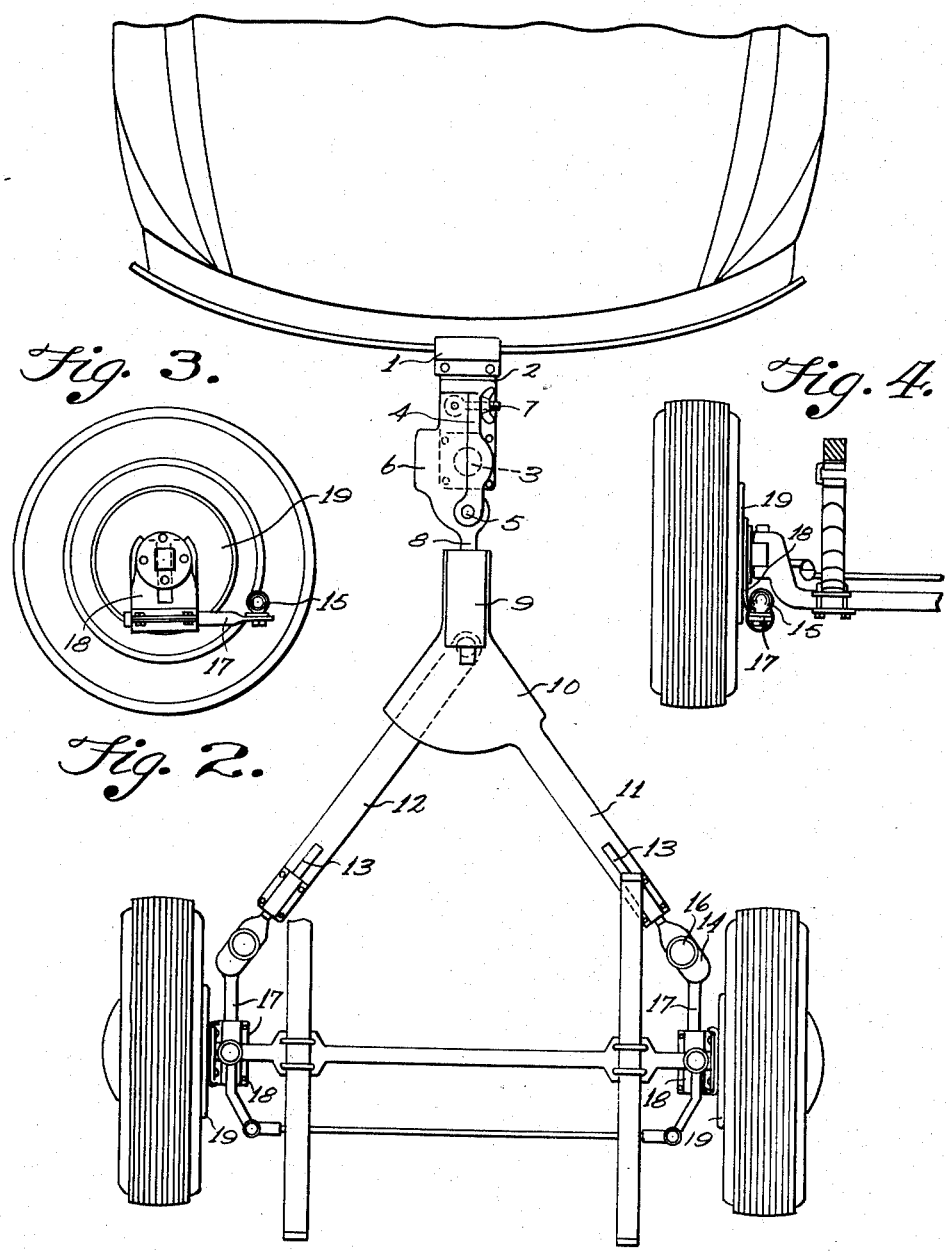

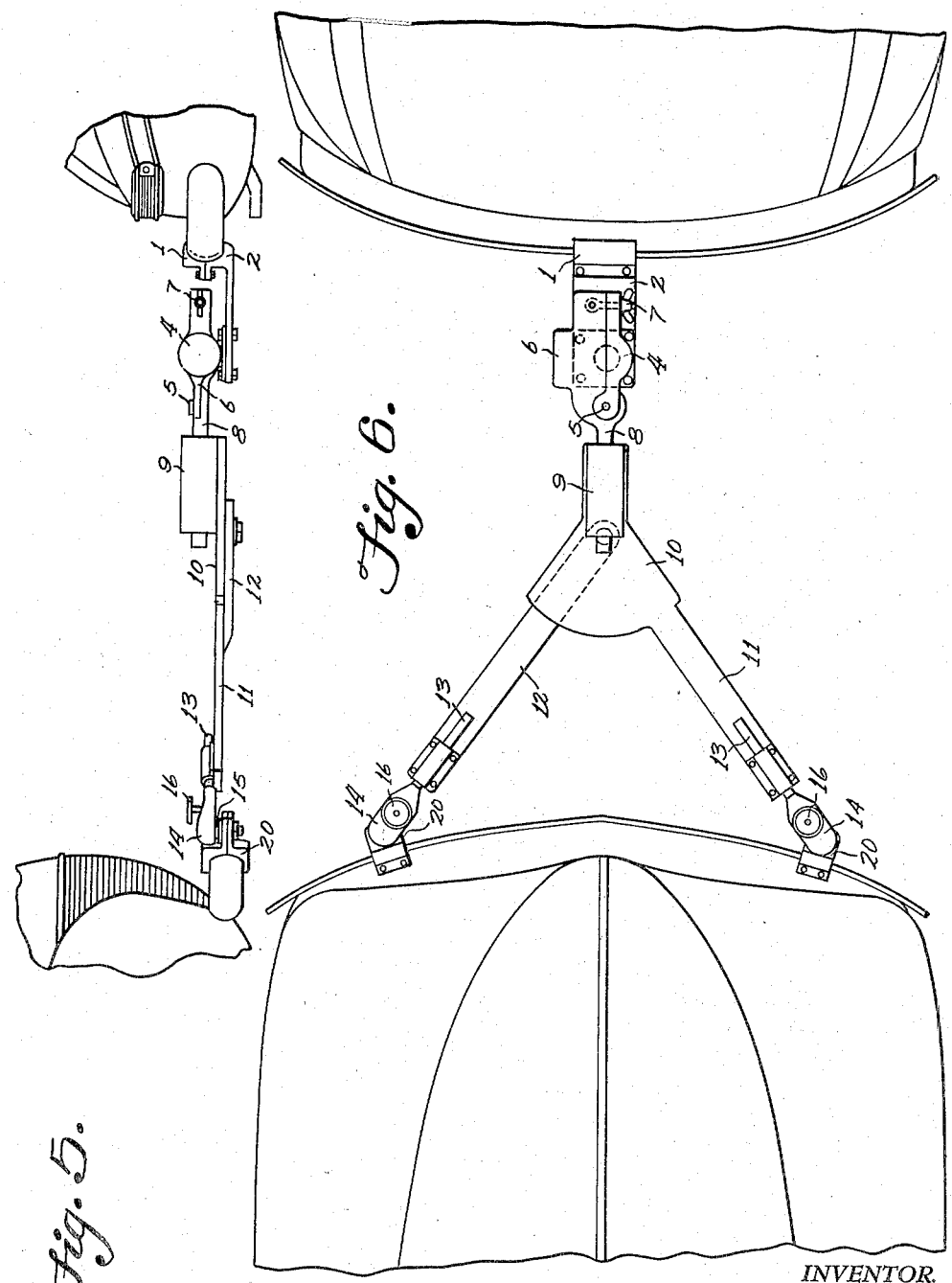

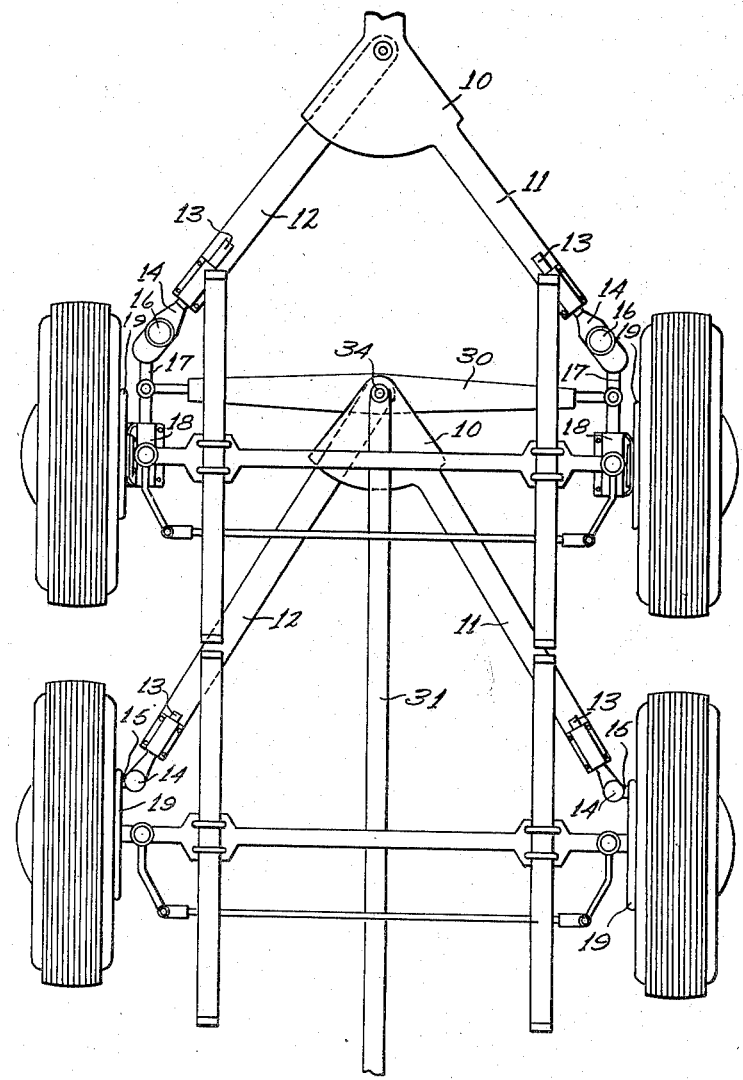

2,522,793

UNITED STATES PATENT OFFICE 2,522,793

NO-SWAY TRAILER HITCH

Fred Koeckritz, Corpus Christi, Tex.

Application November 27, 1946, Serial No. 712,491

1 Claim. (Cl. 280—33.55)

This invention relates to improvements in hitches for motor vehicles, trailers, or trailing axles of vehicles having more than two rear wheels, and has for an object the provision of a multi-drawbar which can be connected to the bumper of a towed automobile or to various parts of a trailer.

A further object is the provision of a hitching device for trailer which comprises a plurality of drawbars which can be folded when not in use.

A further object is the provision of a hitching device for trailers or the like having a substantially three point arrangement with ball and socket connections at each of the points.

A further object is to provide a hitch for trailers of various types and automobiles which enables them to be easily and properly towed with no swaying, also enables easy backing and other manipulations.

A further object is the provision of a hitch for trailers, busses and other motor vehicles which can be attached regardless of the position of tie rods on such vehicles, or whether the vehicle is equipped with more than two front or rear trailer or vehicle wheels.

A further object is to provide a hitch by means of which a trailing tandum having front or rear or both wheel systems can be constructed when desired, for trailers and any other vehicles.

A further object is to provide a hitch for trailers and the like which is adapted for various connections to take care of different situations, as will be readily apparent to those skilled in the art.

These and other objects are attained by the novel construction and arrangement of parts hereinafter described and illustrated by the accompanying drawings, forming a part hereof, and in which:

Figure 1 is a side view of a hitch embodying the invention connected to a trailer and towing automobile;

Figure 2 is a plan view of the hitch;

Figure 3 is a side view of a connection of the hitch to a part of a trailer;

Figure 4 is an end view of the connection shown in Figure 3;

Figure 5 is a side view of a connection of the hitch to the bumper of a towed automobile;

Figure 6 is a plan view of the structure of Figure 5;

Figure 7 is a plan view showing the hitch applied to a trailer or motor vehicle having more than two front wheels;

Figure 8 is a view of another connection for a trailing axle on a vehicle, with more than two rear wheels;

Figure 9 shows a connection to a part of a towed vehicle;

Figure 10 is a side view of the hitch shown in Figure 8;

Figure 11 is a side view of the hitch shown in Figure 7.

Referring to the drawings, the hitch is shown to comprise a clamp adapted to be bolted to the rear bumper of a towing car. The clamp is shown in Figure 1 to include an upper member 1 and a lower L-shaped member 2, the latter having secured thereto a ball 3, (shown in dotted lines) (see Figure 2). The ball 3 is positioned in a cup formed by a clamp member 4 having a recess and pivoted at 5 to a stationary clamp member 6, also having a hollow recess to receive the ball. The members 4 and 6 are secured together by a wing nut and bolt 7.

The clamp member 6 is attached to a rod 8 secured in a tubular casing 9 fixed to a substantially triangular plate 10 which has integral therewith a draw bar 11, and pivoted thereto another drawbar 12. At the ends of each drawbar is secured by clamps or otherwise, a rod 13, having attached thereto, a cup 14, receiving a ball 15, the ball being rotatably held in the cup 14 by means of bolt 16. The ball 15 is attached to a rod 17 which is clamped to a bracket 18 secured to the front brake housing 19. The rods 17 are clamped to the brackets 18 so they may be adjustably positioned thereon for desirable tracking. Since the structure is the same on each side of the hitch as far as the rods 17 and ball 15 are concerned, only one side need be described. The pivot connections can be made at the brake housings, spindles or their flanges, or other suitable places to support the bracket 18.

It will be seen that the hitch has a three point pivoting arrangement which prevents swaying, shimmying and the like. Whether connected to the steering mechanism or not, the trailing response is always instantaneous without impairment of steering ease and under its sole control corrected by predetermined hitch adjustments.

In Figures 5 and 6, is shown the hitch applied to the bumper of an automobile being towed. In this arrangement the cup 14 is shown rotatably connected to ball 15, which is mounted on a bracket 20 clamped to the front bumper of the automobile being towed. The hitch is adapted for direct bumper, body frame or axle attachments, turning the front wheels of any drawn vehicle into a perfectly tracking free-wheeling dolly.

In Figures 7 and 11, the hitch is shown applied to a trailer having more than two front wheels.

In this form, the front hitch is attached as above described in connection with Figure 1, that is by means of a bracket to the brake housing and to the bracket on the bumper of the towing car. A cross bar 30 is pivotally connected to the rods 17, and as shown in Figure 7, an auxiliary bar 31 is pivotally connected to the plate 10 at 34, and the second hitch is connected to the ball 15 which is secured to the brake drum 19 of the rearmost pair of wheels.

However, the bar 31, when used in the form shown in Figure 8, extends forwardly of the plate 10.

In Figures 8 and 10, the hitch on the front wheels is omitted, and the bar 31 is used to make a connection with a ball and socket arrangement at the bracket on the bumper of the towing vehicle, as explained in connection with Figure 1 at the ball connection 33, or to a vehicle front end or cross-bar 30, Figure 7, at 34. It will be seen that the hitch can be arranged and connected in a number of manners to suit different types of vehicles and their tandem axles being towed to prevent swaying of such vehicles and enable easy trailing.

The rods 13 are clamped to the drawbars 11 and 12, so that they may be adjustably positioned thereon to vary the effective lengths of the drawbars.

An elongated slot 32 is provided in bar 31, Figure 8, for receiving the master pivot pin which is connected to a trailer or vehicle at the appropriate location.

The above description is to be considered as illustrative and not limitative of the invention, of which modifications can be made without departing from the spirit and scope of the invention as set forth in the appended claim.

The invention having been described, what is claimed is:

In a hitch for trailing vehicles, a bracket adapted to be attached to the bumper of a towing vehicle, a first ball mounted on the bracket, a first clamp means rotatably receiving the ball, a plate rigidly connected to the clamp means, a rigid drawbar integral with the plate, a second rigid drawbar pivoted at one end to the plate, a first rod on the free end of each drawbar, means adjustably securing each first rod to its respective drawbar whereby each rod can be adjustably positioned longitudinally of each respective drawbar, a cup attached to each first rod, a second ball rotatably received in each cup, means holding each second ball in its respective cup, a second rod attached to each second ball, a bracket adapted to be attached to each brake drum of the front wheels of a trailing vehicle and means adjustably securing each second rod to each bracket, respectively.

FRED KOECKRITZ.

REFERENCES CITED

The following references are of record in the file of this patent:

UNITED STATES PATENTS

| Number | Name | Date |
|---|---|---|
| 2,201,141 | Kotterman | May 21, 1940 |
| 2,306,007 | Thorp | Dec. 22, 1942 |